H. G. FRANK.
RUNNER ATTACHMENT FOR VEHICLES.
APPLICATION FILED APR. 19, 1912.
1,068,883.
Patented July 29, 1913.
2 SHEETS—SHEET 2.
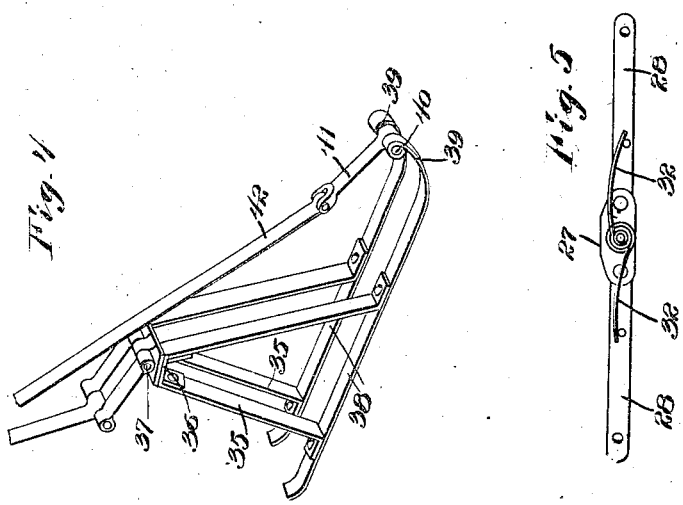
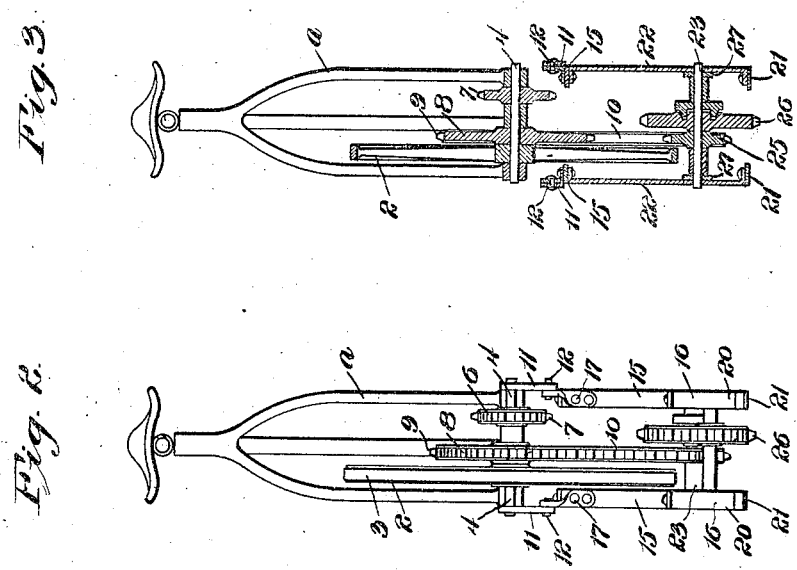
Witnesses
Wm H. Mulligan,
John J. McCarthy
Inventor
Harlow G. Frank.
By Victor J. Evans.
Attorney

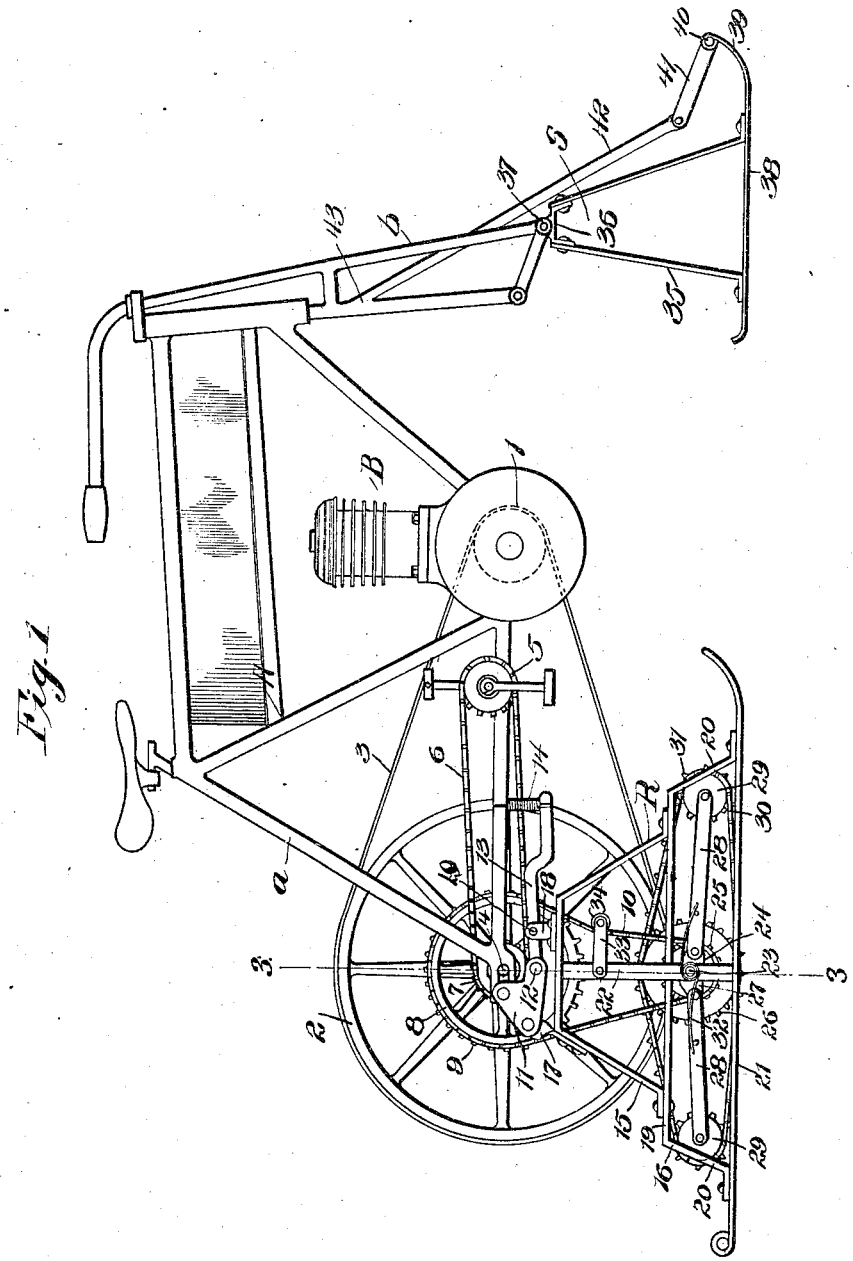

UNITED STATES PATENT OFFICE.

HARLOW G. FRANK, OF DETROIT, MINNESOTA.

RUNNER ATTACHMENT FOR VEHICLES.

1,068,883.  Specification of Letters Patent.  Patented July 29, 1913.

Application filed April 19, 1912. Serial No. 691,838.

*To all whom it may concern:*

Be it known that I, HARLOW G. FRANK, a citizen of the United States of America, residing at Detroit, in the county of Becker and State of Minnesota, have invented new and useful Improvements in Runner Attachments for Vehicles, of which the following is a specification.

This invention relates to improvements in runners and has particular application to runners adapted for attachment to self-propelled vehicles whereby the vehicle may be used as a sleigh.

In carrying out the present invention, it is my purpose to provide a runner which may be attached to a driven vehicle such as a bicycle, motorcycle, automobile or the like, in lieu of the wheels of such vehicle so as to enable the same to travel with facility on snow or ice.

Furthermore, I aim to provide a device of this character which shall include a forward runner by means of which the vehicle may be steered, and a rear runner including a tractor by means of which the vehicle may be driven.

It is also my purpose to provide a device of this type which may be attached to the vehicle and coupled up to the driving means thereof without materially changing the structure of such vehicle, the ground wheels being removed from the vehicle previous to the application of the runners thereto.

A further object of this invention is the provision of a runner adapted for attachment to a vehicle frame and having yieldable connections therewith, so as to prevent the transmission of shocks or jars to the operator upon the vehicle incident to the latter meeting inequalities in the roadway in its path of travel.

The invention has for a still further object the provision of a runner adapted for attachment to a vehicle frame and carrying a driving or propelling mechanism, which mechanism includes a pair of guide rollers, and a relatively large driving roller disposed preferably intermediate the guide rollers, an endless tractor being trained over the said rollers and driven from the driving roller so as to impart movement to the vehicle.

Furthermore, it is my purpose to provide a steering or pilot runner capable of attachment to a vehicle frame and constructed in such manner as to prevent mutilation or buckling of such runner in the movement of the vehicle.

With the above and other objects in view, the invention consists in the construction, combination and arrangement of parts hereinafter set forth in and falling within the scope of the appended claims.

In the accompanying drawings there has been illustrated one practical embodiment of the invention, and in these drawings; Figure 1 is a side elevation of a motor driven vehicle equipped with the present invention. Fig. 2 is a rear end elevation of the same. Fig. 3 is a transverse section on the line 3—3 of Fig. 1. Fig. 4 is a perspective view of the pilot or steering runner, and Fig. 5 is a fragmentary view of a detail of the invention.

Similar reference characters designate like parts throughout the several views.

In the present instance, the invention is shown as applied to a two wheel motor driven vehicle. However, it is to be understood that I do not limit myself to the particular application of the invention as embodied in the drawings, as I contemplate certain modifications and changes which may be made in order to adapt the invention to the best advantage according to the circumstances or requirements in any particular case.

Referring now to the accompanying drawings, the letter A designates the frame of a motor driven vehicle, such as a motorcycle, while B indicates the driving motor upon such frame and provided with a driving wheel 1 having connections with a relatively large belt wheel 2 through the medium of an endless belt 3 adapted to impart movement to the belt wheel from the driving wheel 1 of the motor. This belt wheel 2 is mounted upon a shaft 4 journaled in suitable bearings in the lower end of the rear forks $a$ of the frame A. Mounted upon the frame A of the vehicle adjacent the motor B is a pedal driven sprocket wheel 5 having connection by means of an endless chain 6 with a sprocket wheel 7 mounted upon the shaft 4 and adapted to impart movement to the belt wheel 2 to give the motor B its initial impulse so that the said motor may pick up its own cycle of movement, the motor in this instance being in the form of an explosive engine. Fixed upon the shaft 4 intermediate the sprocket wheel 7 and the belt wheel 2 and receiving motion from the latter is a small belt wheel 8 provided upon its periphery with teeth 9 and over which is trained an endless chain belt 10.

Pivotally connected to the lower end of the rear forks a of the vehicle frame and upon each side thereof, is a link plate 11 each pivotally connected as at 12 to an arm 13, which arm extends longitudinally of the vehicle frame and is connected to the lower bar thereof by means of a spring 14.

The letter R denotes the rear runner of the vehicle which includes a pair of spaced parallel vertically arranged yoke members 15 and a frame 16 connected to the lower ends of such yoke members. These yoke members are disposed upon the opposite sides of the vehicle frame and at their upper extremities are provided with ears 17, adapted to be pivotally connected to the ends of the plate 11 opposite from the connections 12 of the links 13, and ears 18 spaced a suitable distance from the ears 17 and pivotally connected to the links 13, as at 19, in advance of the connections 12 of such links with the link plate 11. Thus, it will be seen that by means of the link plate 11 and links 13 and the spring 14, the transmission of shocks or jars to the frame A of the vehicle from the rear runner is eliminated.

The frame 16 consists of the longitudinal parallel interconnected bars 19 to the upper surfaces of which are connected the yoke members 15 and from which depend the legs 20, the runners 21 being connected to these legs and enabling the vehicle to be driven over snow and ice.

Depending from the interconnecting bar of each yoke member 15 and connected to the respective runner 21, is a standard 22 and journaled in these standards and extending transversely of the frame 16 is a shaft 23, upon which is mounted a belt wheel 24, provided upon its periphery with teeth 25 and designed to receive the chain belt 10. Loosely encircling the shaft 23 is a relatively large driving roller or sprocket wheel 26 adapted to be driven from the belt wheel 24, the latter being splined to the shaft 23 for sliding movement so that the same may be clutched to and unclutched from the driving roller 26, any suitable form of clutch mechanism being employed for this purpose, the movement of the belt wheel 24 being controlled by a lever (not shown) mounted adjacent the driver's seat on the frame A. Fixed to each standard 22 upon the inner sides thereof, is a bracket 27 and pivoted to such bracket at diametrically opposite points are arms 28, 28 extending longitudinally of the frame 16 and upon opposite sides of the standards 22, each pair of arms on the standards being arranged in parallelism with the arms of the adjacent standard. Journaled in the proximate ends of the arms 28 and upon opposite sides of the driving roller 26, are guide rollers 29, 29 and over these guide rollers and driving roller is trained an endless tractor 30 in the form of a belt, chain or the like and provided with teeth 31 adapted to bite into the ice or snow in the movement of the tractor to impart movement to the vehicle. These arms 28, 28 are normally pressed downwardly by means of springs 32, 32 connected to the brackets 27 and bearing upon the upper surfaces of the arms so that the guide rollers 29, 29 will act to hold the tractor at all times in engagement with the adjacent surface of the ground, such springs also permitting movement of the guide rollers and consequently the tractor, upon the vehicle meeting obstructions in its path of travel.

To take up the slack in the driving belt 10 in the movement of the runner R relatively to the vehicle frame, an arm 33 is connected to one of the standards 22 in any suitable manner and carries at its free end a spring pressed roller 34 which at all times engages the driving belt 10 and acts thereon to draw the same inwardly and hold such belt taut thereby permitting the transmission of a positive movement to the driving roller 26 irrespective of the movement of the runner R.

The forward steering or pilot runner is designated at S and consists of a frame composed of spaced parallel vertical standards 35, 35 interconnected at their upper ends through the medium of a cross bar 36 and slidably connected to the forward forks b of the machine by means of a sliding spring joint 37 so that the runner may move relatively to the front forks of the frame upon meeting an obstruction or inequality in the travel of the machine. Connected to the lower ends of the standards 35 are runners 38 terminating at their forward ends in upstanding portions 39 interconnected by a cross bar 40. Pivotally connected to this cross bar 40 is an arm 41 having its free end also pivotally connected to a rod 42 secured to the frame of the vehicle as at 43, such rod and arm being movable relatively to each other and serving to prevent buckling or mutilation of the forward runner in the movement of the machine and in the steering of such machine.

From the foregoing description taken in connection with the accompanying drawings, the construction and operation of my invention will be readily understood and while I have herein shown and described one form of my invention by way of illustration, it is to be understood that I do not confine myself to the exact details of construction herein shown and described, as modification and variation may be made without exceeding the scope of the claims or without departing from the spirit of the invention.

I claim:

1. The combination with a vehicle frame and driving means on the frame, of a runner, yieldable connections between said runner and frame, said connections comprising a link plate pivotally connected at one point to the vehicle frame, and at another point to said runner, an arm pivotally connected to said link plate, pivotal connections between said arm and runner, said arm extending longitudinally of the vehicle frame, and a spring connected to the free end of the arm and to the vehicle frame, a propelling mechanism on said runner, and connections between the driving mechanism on the frame and said propelling mechanism.

2. The combination with a vehicle frame and driving means on the frame, of a runner, connections between said runner and frame, and a propelling mechanism on said runner, said mechanism comprising pairs of arms pivotally connected to the runner and extending in opposite directions, guide rollers journaled in the free ends of each pair of arms, tension means acting upon said arm to force the guide rollers in one direction, a driving roller journaled in said runner between said guide rollers, an endless tractor trained over said driving roller and guide rollers, and driving connections between the driving means and said driving roller.

In testimony whereof I affix my signature in presence of two witnesses.

HARLOW G. FRANK.

Witnesses:
WILLIAM L. JONES,
WILLIAM CALVIN RHODES.